(12) United States Patent
Rinner

(10) Patent No.: US 10,532,410 B2
(45) Date of Patent: Jan. 14, 2020

(54) TOOL HOLDER WITH COILED SPRINGS

(71) Applicant: James A Rinner, Franksville, WI (US)

(72) Inventor: James A Rinner, Franksville, WI (US)

( * ) Notice: Subject to any disclaimer, the term of this patent is extended or adjusted under 35 U.S.C. 154(b) by 36 days.

(21) Appl. No.: 15/442,599

(22) Filed: Feb. 24, 2017

(65) Prior Publication Data

US 2017/0246693 A1 Aug. 31, 2017

Related U.S. Application Data

(60) Provisional application No. 62/299,923, filed on Feb. 25, 2016.

(51) Int. Cl.
*B25B 23/00* (2006.01)
*B23B 31/107* (2006.01)

(52) U.S. Cl.
CPC ........ *B23B 31/107* (2013.01); *B23B 31/1071* (2013.01); *B25B 23/0035* (2013.01); *B23B 2231/04* (2013.01); *B23B 2231/34* (2013.01); *B23B 2260/136* (2013.01); *Y10S 279/904* (2013.01); *Y10T 279/17521* (2015.01); *Y10T 279/17761* (2015.01); *Y10T 279/17794* (2015.01); *Y10T 279/3412* (2015.01)

(58) Field of Classification Search
CPC . B23B 31/107; B23B 31/117; B23B 31/1174; B23B 2231/04; B23B 2231/48; B23B 2260/136; B25B 23/0035; Y10T 279/17153; Y10T 279/17761; Y10T 279/17521; Y10T 279/17743; Y10T 279/17786; Y10T 279/17794; Y10T 279/3406; Y10T 279/3412; Y10S 279/904
See application file for complete search history.

(56) References Cited

U.S. PATENT DOCUMENTS

| | | | | |
|---|---|---|---|---|
| 2,593,794 A | * | 4/1952 | Resina | B67B 3/2066 279/23.1 |
| 2,999,407 A | * | 9/1961 | De Frangesco | B21J 15/18 173/211 |
| 3,222,096 A | * | 12/1965 | Kaman | B25B 23/0035 279/23.1 |
| 3,767,218 A | * | 10/1973 | Linthicum | B23B 31/22 279/75 |
| 3,819,194 A | * | 6/1974 | Grevich | B65B 3/16 141/313 |
| 3,958,809 A | * | 5/1976 | Child | B23B 31/1173 279/133 |
| 4,174,113 A | * | 11/1979 | Eckman | B25D 17/08 173/132 |
| 4,902,177 A | * | 2/1990 | Burnett | B23B 31/1173 279/18 |
| 7,278,640 B2 | * | 10/2007 | Allan | B23B 31/1173 279/79 |
| 9,138,873 B2 | * | 9/2015 | Merrick | B25B 13/44 |
| 2010/0289198 A1 | * | 11/2010 | Balsells | B21F 35/00 267/151 |

* cited by examiner

*Primary Examiner* — Eric A Gates
*Assistant Examiner* — Chwen-Wei Su
(74) *Attorney, Agent, or Firm* — Brainspark Associates, LLC

(57) ABSTRACT

Devices, systems and methods for holding devices, including tool holders and/or associated apparatus, that can be attached to various driving mechanisms. Various embodiments can include one or more canted, or slanted, coil springs that are capable of forming to various shapes by the application of a controlled force.

20 Claims, 8 Drawing Sheets

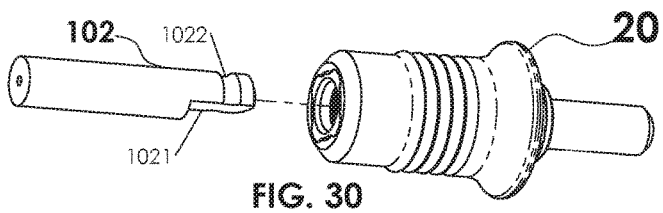
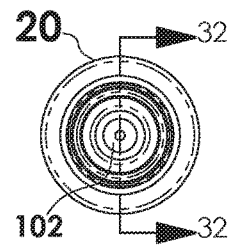
FIG. 30　　FIG. 31
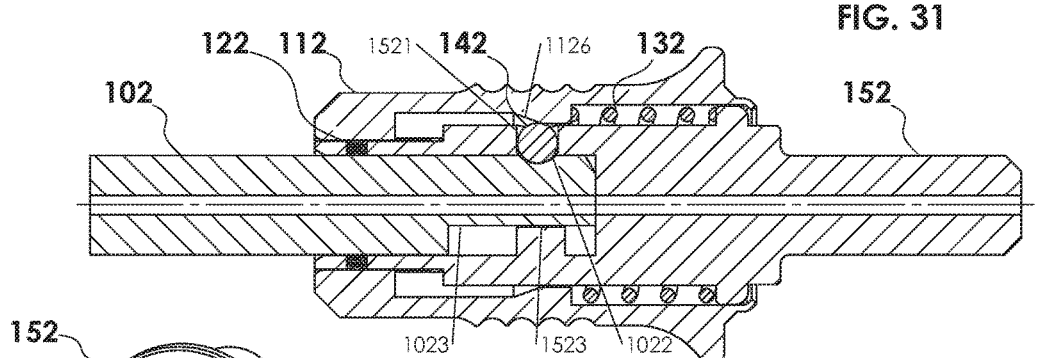
FIG. 32
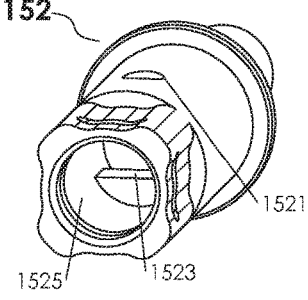
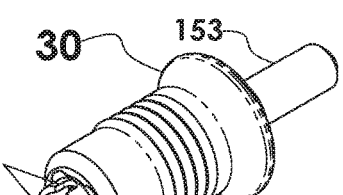
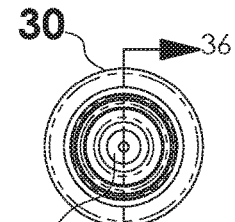
FIG. 33　　FIG. 34　　FIG. 35
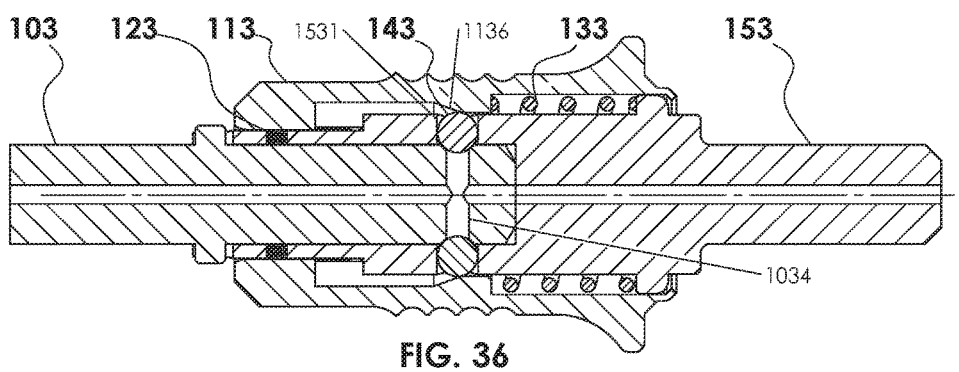
FIG. 36

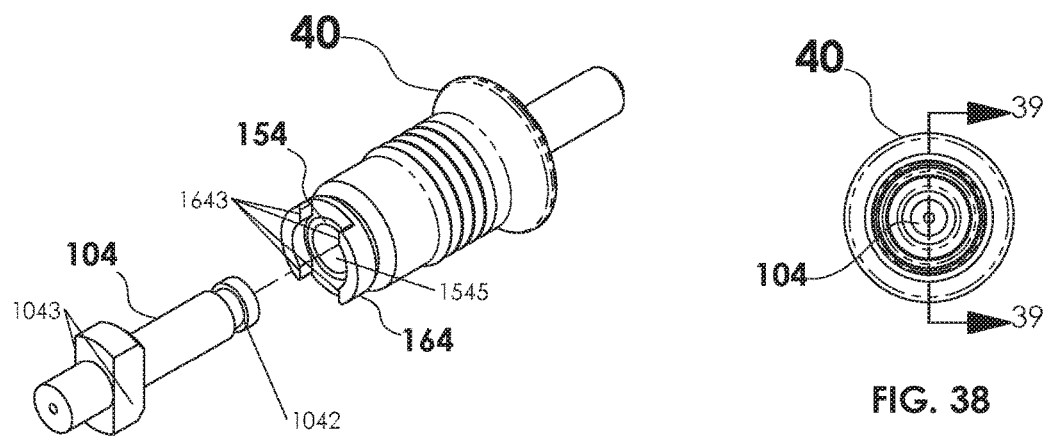
FIG. 37
FIG. 38
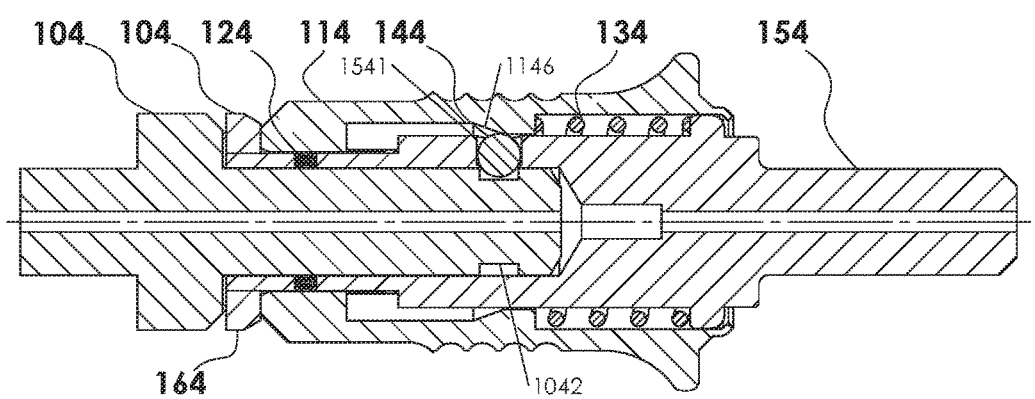
FIG. 39
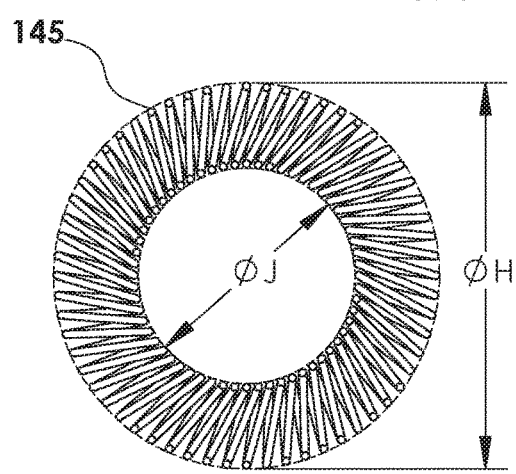
FIG. 40
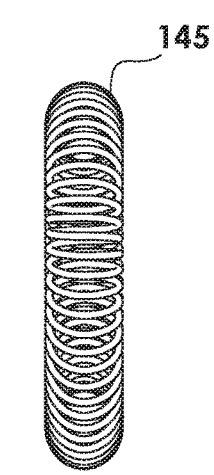
FIG. 41

TOOL HOLDER WITH COILED SPRINGS

CROSS-REFERENCE TO RELATED APPLICATIONS

This application claims the benefit of U.S. Provisional Patent Application Ser. No. 62/299,923 entitled "Tool Holder With Coiled Springs," filed Feb. 25, 2016, the disclosure of which is incorporated by reference herein in its entirety

TECHNICAL FIELD

Disclosed are devices, systems and associated methods for holding devices, including tool holders and/or associated apparatus, that can be attached to various driving mechanisms that could be driven by hand, electricity, hydraulic, pneumatic or other forms of driving force. Desirably, such tool holders can accept various types of driven bits such as, but not limited to, a screwdriver, drill, nut driver or chisel. Various embodiments can include one or more canted, or slanted, coil springs that are capable of forming to various shapes by the application of a controlled force.

BACKGROUND OF THE INVENTION

Tool holders used for inserting screws, drilling holes or revolving various devices or attachments have been used in the workforce for many years. A typical tool holder will desirably have a clearance between the tool and the tool holder (i.e. a shaft of a tool should be smaller than the hole in the tool holder it is being inserted into) so the tool can be easily inserted and removed from the tool holder. Because some attachments need to be precisely held in position without moving, or shaking around (especially when used with robotically controlled machines or precision placement of objects), there have been various products introduced, (i.e. Gao U.S. Pat. No. 7,740,249) that employ a variety of springs, sleeves and balls. In these devices, all of the components must typically be precisely machined so that the holder works as intended. Since many manufacturers produce such tools and/or tool holders, these manufacturers often use a wide variety of tolerancing for their devices, and thus there is often the chance that some of the tools and/or tool holders may not be held as precisely as intended or desired.

SUMMARY OF THE INVENTION

The present invention includes a tool holder that employs one or more elastic and/or deformable peripheral member(s) in conjunction with other elements to engage tools, tool shafts, bits and/or driven members of varying shapes, sizes and/or configurations. In various embodiments, these elements, and the varying configurations and arrangements thereof, can replicate many features of prior art tool holding devices using fewer components, at lower cost and/or with less demanding machining and manufacturing requirements. In addition, various embodiments may allow a single tool holder design to accommodate multiple shapes of tool shafts and tools (i.e., both square drive and hex drive sockets using the same tool holder).

BRIEF DESCRIPTION OF THE DRAWINGS

The present invention will be more understood in the detailed description and the accompanying drawings.

FIG. 30 depicts a lower perspective view of an alternative embodiment of a tool holder 20, with a tool having a drive shaft 102 representing what is commonly known as an "AO" type tool shaft;

FIG. 31 depicts a right planar view of the tool holder 20, with a AO-type shaft 102 in a "locked" position, showing section lines 32-32;

FIG. 32 is an enlarged sectional view of the area 32-32, shown in FIG. 30;

FIG. 33 depicts a left perspective view of a body section 152 of the tool holder 20;

FIG. 34 depicts a perspective view of an alternative embodiment of a tool holder 30, with a tool drive shaft 103 representing what is commonly known as an "Trinkle" type tool shaft;

FIG. 35 depicts a right planar view of the tool holder 30, with a Trinkle tool shaft 103 in a "locked" position, showing section lines 36-36;

FIG. 36 is an enlarged sectional view of the area 36-36 shown in FIG. 35;

FIG. 37 depicts a perspective view of another alternative embodiment of a tool holder 40, with a tool drive shaft 104 representing what is commonly known as an "Hudson" type tool shaft;

FIG. 38 depicts a right planar view of the tool holder 40, with a Hudson drive shaft 104 in a "locked" position, showing section lines 39-39;

FIG. 39 is an enlarged sectional view of the area 39-39 shown in FIG. 38;

FIG. 40 depicts a front planar view of a coil spring 145;

FIG. 41 depicts a side planar view of the coil spring 145 of FIG. 40;

DETAILED DESCRIPTION OF THE DRAWINGS

In the following detailed description, for purposes of explanation, numerous specific details are set forth to provide a thorough understanding of the various embodiments of the disclosure. Those of ordinary skill in the art will realize that these various embodiments are illustrative only and are not intended to be limiting in any way. In addition, for clarity purposes, not all of the routine features of the embodiments described herein may be shown or described for every alternative embodiment. One of ordinary skill in the art would readily appreciate that in the development of any such actual implementation, numerous implementation-specific decisions may be required or desirable to achieve specific design objectives. These design objectives may vary from one implementation to another and from one developer to another, and the variations thereof are contemplated and included in the present disclosure.

Function

The intended use of the various embodiments of the tool holder with coiled springs is for holding, driving, moving and/or rotating a variety of attachments in order to drill, thread, drive, rotate, impact and/or place various components or other devices. Such tool holders can be utilized in conjunction with a wide variety of tools, including rotary, reciprocating and/or oscillating-type tools and tool drivers, as well as tools and/or tool holders of various designs that might benefit from the tool holding features described herein.

Components

Those of ordinary skill in the art should realize that the various embodiments described herein are illustrative only, are not intended to be limiting in any way and can be combined and subtracted to fit the specific needs during surgery or other procedures.

Desirably, the overall dimensions and/or thickness or width and/or diameters of the invention (as well as the various components of the invention) can be customized and/or particularized to an individual use.

Specifications

Figure 1:
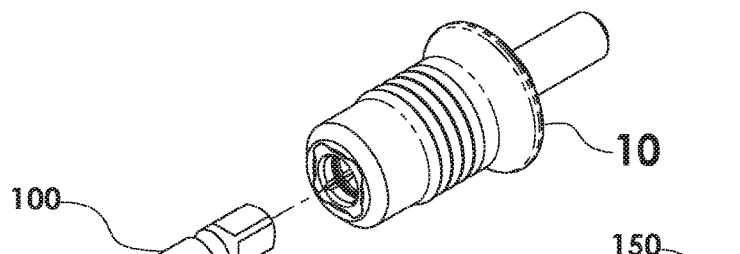
FIG. 1 depicts a perspective view of one exemplary embodiment of a tool holder 10 constructed in accordance with various teachings of the present invention, into which a square drive tool shaft 100 is being inserted.

FIG. 1 depicts a perspective view of one exemplary embodiment of a tool holder 10, constructed in accordance with various teachings of the present invention, with what is commonly known as a square drive tool shaft 100 representing a "tool" to be connected to or otherwise held by the holder. As described earlier (in connection with the Gao patent—U.S. Pat. No. 7,740,249), various manufacturers and/or designers have previously attempted to improve various tool holder designs in a variety of ways, including by reducing the amount of play, shake and/or toggle between the connected tool and the tool holder by incorporating a variety of sliding components and/or balls. In order for such components to function as designed they often must rely highly on precision machining of both the tools (i.e., the tool shafts) and the tool holder components, which cost the manufacture, and eventually the end user, more money for all components of the system. Moreover, whether the tool adapter is used in a general shop setting or in a surgical suite, there are typically foreign bodies and/or other materials that can migrate into the adapter and cause the various components to fail (or even worse in a surgical setting—cause contamination which could lead to infections and/or other pyrogenic reactions).

The various embodiments disclosed herein can include a variety of components and component arrangements. With comparison to the holding devices disclosed in the Gao patent (U.S. Pat. No. 7,740,249), for example, at least one embodiment of a tool holder disclosed herein can include various components that replace three spherical balls, two sliding collars, and a compression spring of the Gao device to radially and axially stabilize the tool in the body, or tool holder. In various embodiments, a single component, such as a canted, or slanted, coil spring, can be used in place of such multiple component assemblies described in Gao, to stabilize a wider variety of tools and/or tool types than those allowed by the Gao devices.

Figure 2:
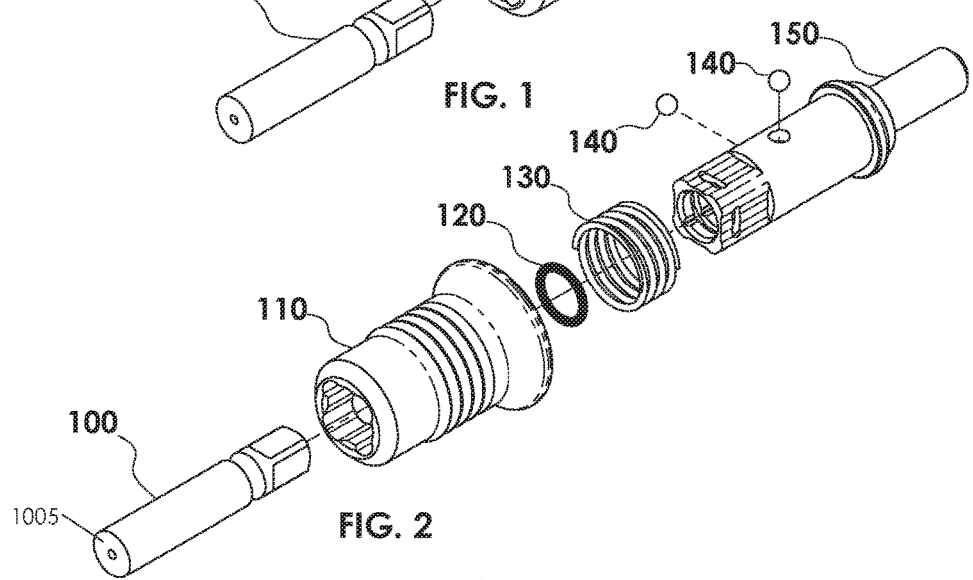
FIG. 2 depicts an exploded perspective view of the tool holder 10 of FIG. 1.
Figure 3:
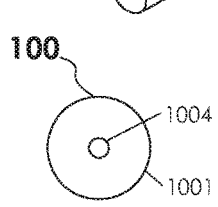
FIG. 3 depicts a left planar view of the tool 100 of FIG. 1.
Figure 4:
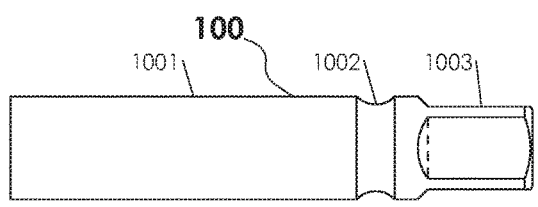
FIG. 4 depicts a front planar view of the tool 100 of FIG. 1.
Figure 5:
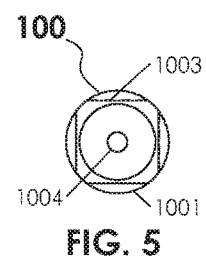
FIG. 5 depicts a right planar view of the tool 100 of FIG. 1.

As depicted in FIG. 2, one component for accomplishing various objectives of the present invention can be the incorporation of one or more canted, or slanted, coil springs 120. Because the coils of the spring are angled (see angle C in FIG. 7), the form, or shape of the spring can easily be modified by deflection and/or manipulation of an adjacent feature in a variety of ways.

Figure 11:
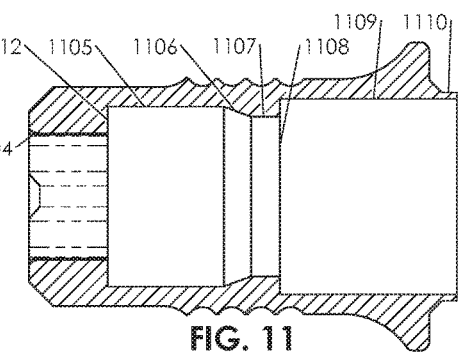
FIG. 11 is an enlarged sectional view of the area 11-11 shown in FIG. 9.
Figure 12:
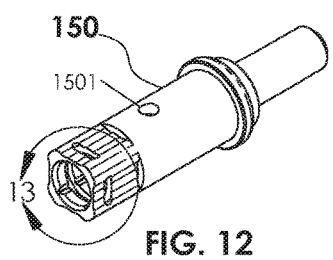
FIG. 12 depicts a perspective view of an embodiment of a body 150 from FIG. 2, showing detail view 13.
Figure 13:
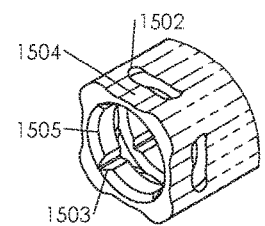
FIG. 13 is an enlarged partial view of the area 13, shown in FIG. 12.
Figure 15:
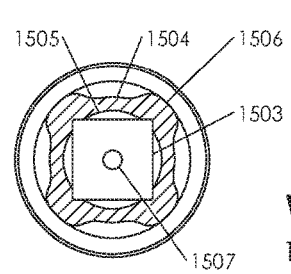
FIG. 15 is an enlarged sectional view of the area 15-15 of FIG. 14.
Figure 17:
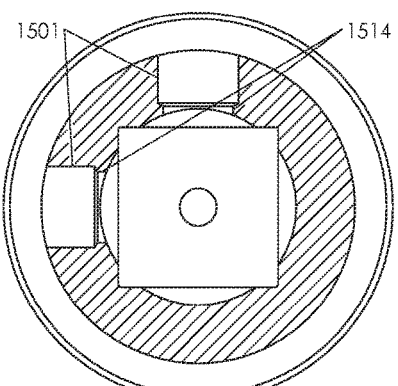
FIG. 17 is an enlarged sectional view of the area 17-17 of FIG. 14.
Figure 18:
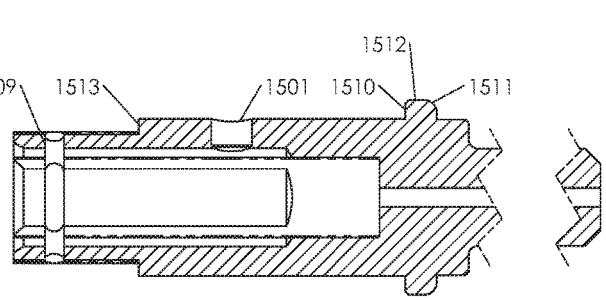
FIG. 18 is an enlarged sectional view of the area 18-18 of FIG. 14.
Figure 19:
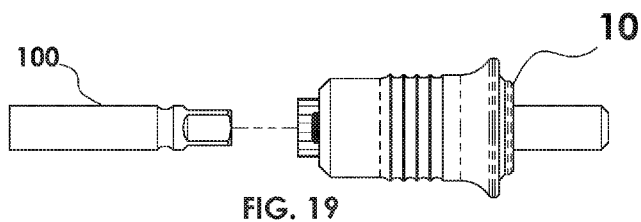
FIG. 19 depicts a front planar view of the exemplary embodiment of a tool holder 10 with a square drive shaft 100.
Figure 20:
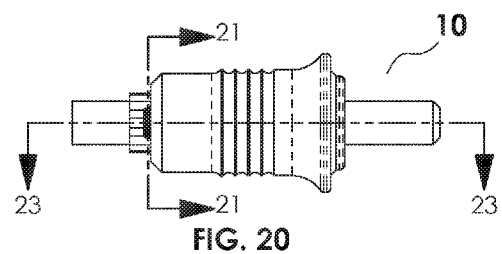
FIG. 20 depicts a front planar view of the tool holder 10 of FIG. 19 with the square drive shaft 100 inserted into the tool holder, and the collar 110 retracted, showing section lines 21-21 and 23-23.
Figure 21:
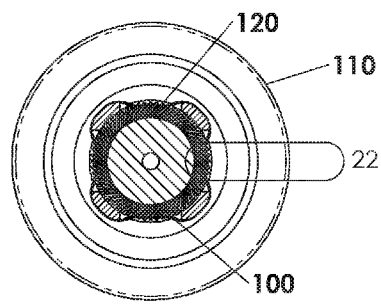
FIG. 21 is an enlarged sectional view of the area 21-21 shown in FIG. 20, showing area 22.

As depicted in FIG. 2 a tool holder 10 can comprise a body 150, one or more retaining balls 140, a compression spring 130, a canted coil spring 120 and a collar 110. The retaining balls 140 in this embodiment can be placed into their respective holes 1501 (see FIGS. 12, 17 and 18). Those skilled in the art should understand that various embodiments of a tool holder need not necessarily incorporate two retaining balls 140 to function properly, but might also retain a desired tool 100 with only one retaining ball 140, or with more than two retaining balls or other components. After placement of the retaining balls 140, the compression spring 130 and the canted coil spring 120 can placed in a desired position and/or orientation. Next, the collar 110 can be placed over the prior-described components, with the machined diameter 1110 of the collar 110 (see FIG. 11) swaged or otherwise machined or formed into a conical surface 1113 (see FIG. 23) that will desirably retain the collar 110 on the sub-assembly. This retention of the collar 110 is possible in this embodiment because the swaged conical surface 1113 is now a smaller diameter than the flange 1512 (see FIG. 18) and contacts a radial fillet surface 1511 when the compression spring 130 applies force upon faces 1108 of the collar 110 and 1510 of the body 150, such that the collar 110 moves along the axis K of the invention when there is not a tool 100 in place within the tool holder.

The body 150 can include surfaces 1504 and 1506 that provide a desired clearance for the surfaces 1103 and 1111 of the collar 110. The body 150 may also include elongated access holes 1502 that can allow a canted coil spring 120, or portions thereof, to pass into and/or through the holes. A chamfered surface 1505 can be provided that helps to align and/or guide a tool 100 into the body 150. If desired, the body can include female square driving surfaces 1503 that can mate with various surfaces on the tool, such as the male square driving surfaces 1003 depicted in the tool 100 of FIG. 2. In various alternative embodiments, the number of features 1502, 1504 and 1506 on the body 150, and/or the corresponding features 1103 and 1111, need not necessarily include four symmetrically opposed features (as shown in various drawings), but may include other arrangements, including differing numbers and/or arrangements of such features, as well as no-symmetric arrangements of some or all such features. Those of ordinary skill in the art should understand that as little as one, or more than four, sets of features could be utilized with various embodiments of tool holders. In addition, one or ordinary skill in the art should understand that the square shaped drive 1103 of the tool 100, and corresponding shape 1503 of the tool holder 50, could be a variety of shapes, including one flat, two flats, triangular and/or other polygon shapes (including circular shapes, if desired) without departing from the objectives of the present invention. Moreover, the tool holder 100 could optionally include a surface 1005 or other feature where the various driving ends could be, but not limited to, screwdriver points, drills or holders of different shapes (or such shapes could be added).

Figure 14:
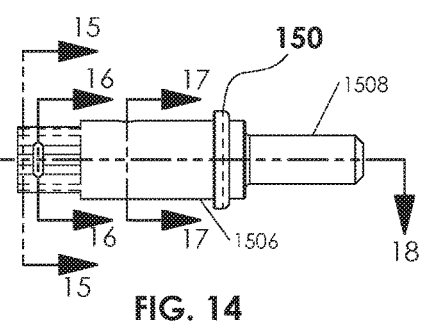
FIG. 14 depicts a front planar view of the embodiment of the body 150 from FIG. 2, showing section lines 15-15, 16-16, 17-17 and 18-18.

Also shown on the body 150 (see FIG. 14) is a diameter stud 1508. This diameter stud 1508 is shown as a generic attachment point between the tool holder 10 and a driving mechanism which can be, but is not limited to, a screwdriver handle, a drill and/or a machine. The driving force can be, but should not be limited to, forced induced by hand, as well as forces created by mechanical power, by electric power, by hydraulic power, by pneumatic power or by magnetic power. Though shown as a male shaft, it should be understood that this attachment point could also be, but not limited to, a female diameter, as well as a permanent connection point and/or removeable threaded connection point, a tapered or press fit connection, a bonded connection and/or a welded attachment. If desired, such alternative connection methods could similarly be used between various components of the other embodiments of the invention describe herein.

Though the body 150 and tool 100 show a cannulated, or through, diameter 1507 and 1004 respectively for the passage of guide wires, in alternative embodiments such features may not be absolutely necessary for the proper function of the invention.

Figure 6:
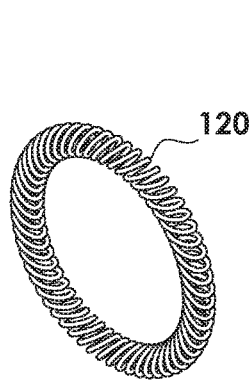
FIG. 6 depicts a perspective view of a coil spring 120 for use with the embodiment of FIG. 1.
Figure 7:
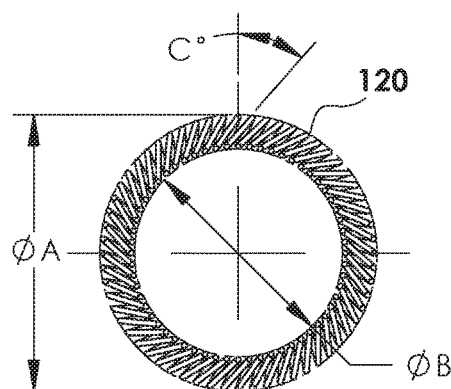
FIG. 7 depicts a front planar view of the coil spring 120 of FIG. 6.
Figure 8:
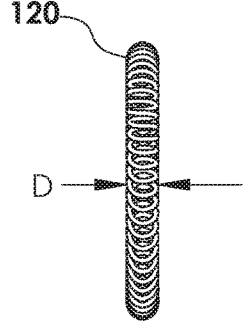
FIG. 8 depicts a side planar view of the coil spring 120 of FIG. 6.
Figure 9:
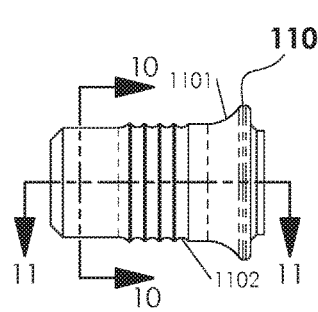
FIG. 9 is a front planar view of one embodiment of a collar 110, showing section lines 10-10 and 11-11.
Figure 16:
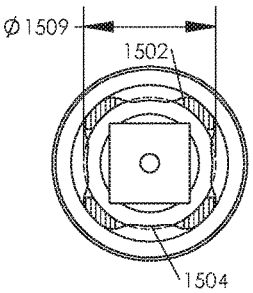
FIG. 16 is an enlarged sectional view of the area 16-16 of FIG. 14.
Figure 22:
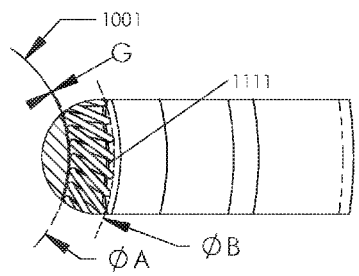
FIG. 22 is an enlarged sectional view of the area 22 shown in FIG. 21.

As best seen in FIGS. 6 through 8, the canted coil spring 120 can have, in its static manufactured shape (i.e., unflexed condition), an outer diameter A which is the same or similar dimensions (or possibly slightly larger) as the groove diameter 1509 of the body 150 (see FIG. 16), and the inside diameter B of the spring 120 is desirably larger than an outer diameter 1001 of the tool 100, which desirably creates a gap G (see FIG. 22) between the outer diameter 1001 of the tool 100 and the inner diameter A of the canted coil spring 120. The width D, shown in FIG. 8, desirably fits between the walls of the groove 1509 in the body 150.

Figure 10:
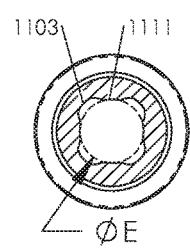
FIG. 10 is a sectional view of the area 10-10 shown in FIG. 9.
Figure 23:
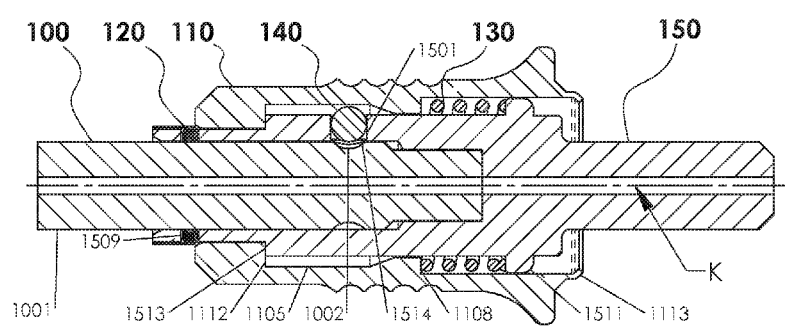
FIG. 23 is an enlarged sectional view of the area 23-23 shown in FIG. 20.
Figure 24:
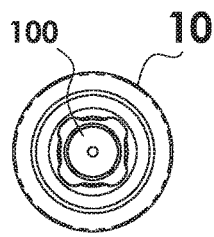
FIG. 24 depicts a left planar view of the invention 10 with a square drive shaft 100 in the locked position.
Figure 25:
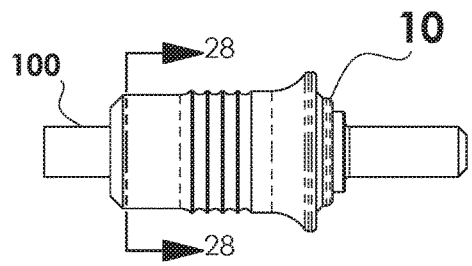
FIG. 25 depicts a front planar view of the tool holder 10 of FIG. 19 with the square drive shaft 100 in a "locked" position, showing section lines 28-28.
Figure 26:
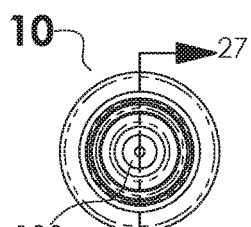
FIG. 26 depicts a front planar view of the tool holder 10 and associated square drive shaft 100 of FIG. 25, showing section lines 27-27.
Figure 27:
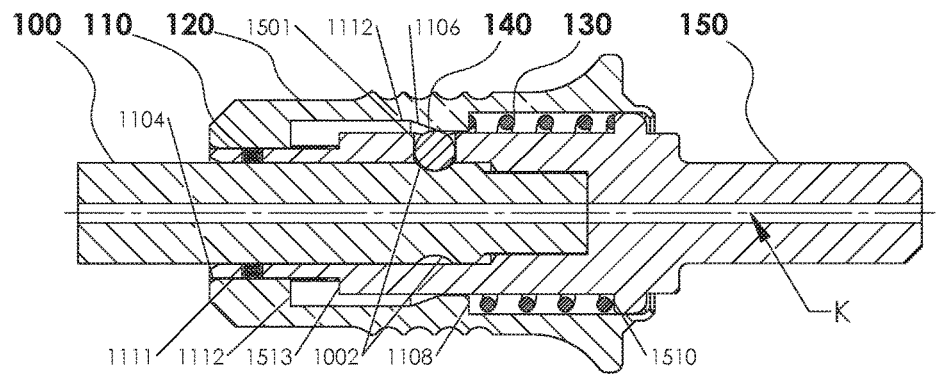
FIG. 27 is an enlarged sectional view of the area 27-27 shown in FIG. 26.
Figure 28:
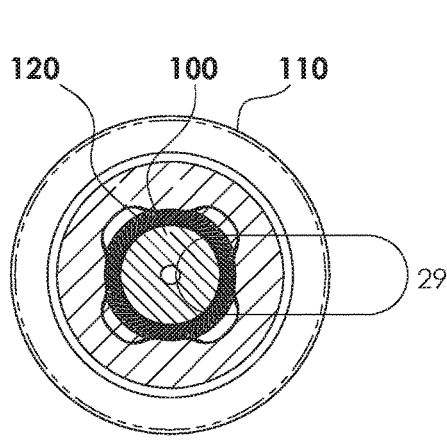
FIG. 28 is an enlarged sectional view of the area 28-28 shown in FIG. 25, showing area 29.
Figure 29:
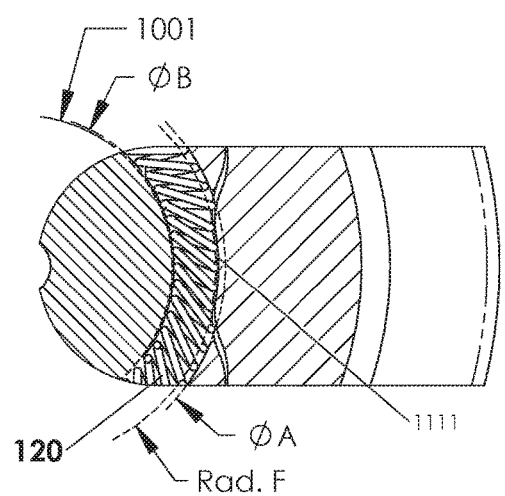
FIG. 29 is an enlarged partial view of the area 29 of FIG. 28.
Figure 42:
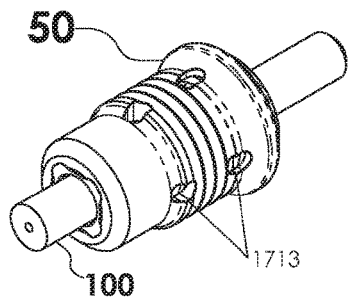
FIG. 42 depicts a perspective view of an embodiment of a the tool holder 50 with a square drive shaft 100, representing a tool.
Figure 43:
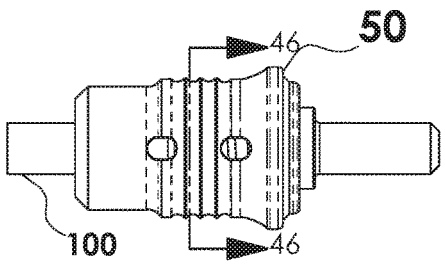
FIG. 43 depicts a front planar view of the tool holder 50, showing section lines 46-46.
Figure 44:
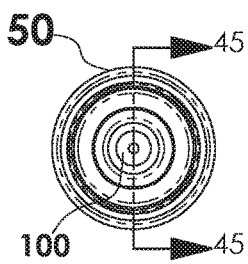
FIG. 44 depicts a right planar view of the tool holder 50, showing section lines 45-45.

As best seen in FIG. 23, when the collar 110 is axially moved along the axis K, and face 1112 of the collar 110 contacts face 1513 of the body 150, the diametric surfaces 1111 (see diameter E in FIG. 10) of the collar are moved away from the spring 120, such that they no longer contact the outer surface of the canted coil spring 120, which can allow the spring 120 to return to a static (i.e., unflexed and/or partially unflexed) shape, where the diameter A of the spring 120 is larger than the diameter 1101 of the tool. Simultaneously, an inner surface of the collar 110 can be slid away from the retention balls 140, which allows the balls 140 to freely float in the holes 1501 between the diametrically smaller holes 1514 and the inner diameter 1105 of the collar 110. When this occurs, the tool 100 can desirably slide freely into and/or out of the tool holder 150. To lock the tool 100 in position (see FIGS. 24 through 29), a user can release the collar 110, which allows the compression spring 130 to urge and/or move the collar 110 along axis K in a desired direction, which causes the ball 140 to come into contact with the conical surface 1106 of the collar 110, and which in turn causes the retention balls 140 to move toward the axis K in the holes 1501 of the body 110, until the balls 140 come into contact with the curved diametric surface 1002 of the tool 100. Concurrently, the canted coil spring 110 will contact the fillets 1104 of collar 110, and the collar 110 should continue to move along axis K until the four diametric surfaces 1111 of the collar 110 compress and/or otherwise deform the areas of the canted coil spring 120 that are contacted. For example, FIG. 29 depicts a static shape of the canted coil spring 120, represented by diameters A and B, with changes in the spring shape in areas where the diametric surfaces 1111 contact the spring 120, which in the figure have reduced radial areas represented by RAD. F. In this condition, a gap G (see FIG. 22) will desirably no longer exist between the canted coil spring 120 and the tool in the areas where the diametric surfaces 1111 contact the canted coil spring 120. The reduced radial area RAD. F desirably produces spring pressure onto the shaft and holds it into position. When the collar 110 is pulled back, such as shown in FIG. 23, the canted coil spring 120 will desirably return to the static position and the tool 100 can be easily removed and/or replaced.

Another embodiment of a tool holder 20 constructed in accordance with various teaching of the present invention is depicted in FIGS. 30 through 33, wherein the tool 102 includes a driving end (commonly known as an AO connection) where there is a single driving flat 1023 on the tool 102 and a corresponding engagement feature 1523 on the body 152. In this embodiment, the various similar canted coil spring 122 features, the body 152 features 1521 and 1525, the collar 112 features 1126 and the tool 102 features 1022 desirably work in the same or a similar manner as those described in connection with the embodiment of a tool holder 10, as previously described.

Another alternative embodiment of a tool holder 30 constructed in accordance with various teaching of the present invention is depicted in FIGS. 34 through 36, where the tool 103 includes a driving end (commonly known as a Trinkle connection) where the driving feature is a set of protrusions or enlarged diameters 1033 on the tool 103, with corresponding engagement features 1533 on the body 153. In this embodiment, the various similar canted coil spring 123 features, the body 153 features 1531 and 1535, and the collar 113 feature 1136 desirably work in the same or similar manners as those described in connection with the embodiment of a tool holder 10, as previously described. In this embodiment, instead of a curved diametric surface 1002 of the tool shaft 100, there can be provided a through hole 1034 and conical surface 1031 that desirably retain the tool 103 in position when the balls 143 nest into the conical surfaces 1031, if desired.

Another alternative embodiment of a tool holder 40 constructed in accordance with various teaching of the present invention is depicted in FIGS. 37 through 39, wherein the tool 104 includes a driving end (commonly known as a Hudson connection) where the driving feature is a set of parallel tabs 1043 on the tool 104, that desirably mate into a groove defined by four walls 1643 on the ring 164. In this embodiment, the various similar canted coil spring 124 features, the body 154 features 1541 and 1545, and the collar 114 feature 1146 desirably work in the same or similar manners as those described in connection with the embodiment of a tool holder 10, as previously described. In this embodiment, instead of a curved diametric surface 1002 of the tool shaft 100, there is a groove 1042 that desirably retains the tool 104 in position when the balls 144 nest into the groove 1042. The ring 164 can be attached to the body 154 in various ways such as, but not limited to, welding, threading and/or bonding.

Figure 45:
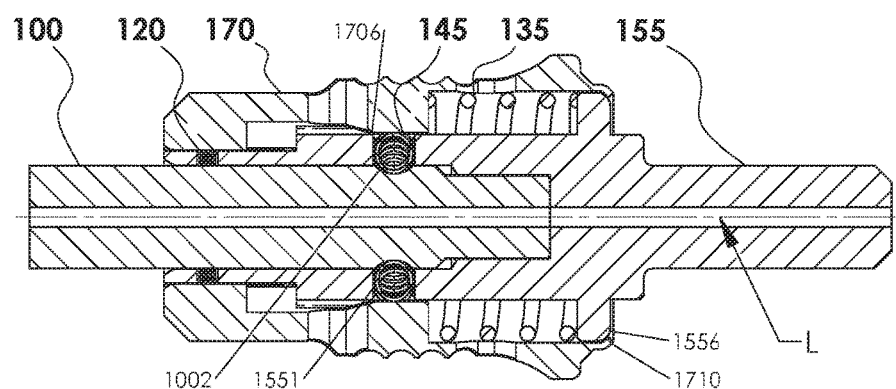
FIG. 45 is an enlarged sectional view of the area 45-45 of FIG. 44.
Figure 46:
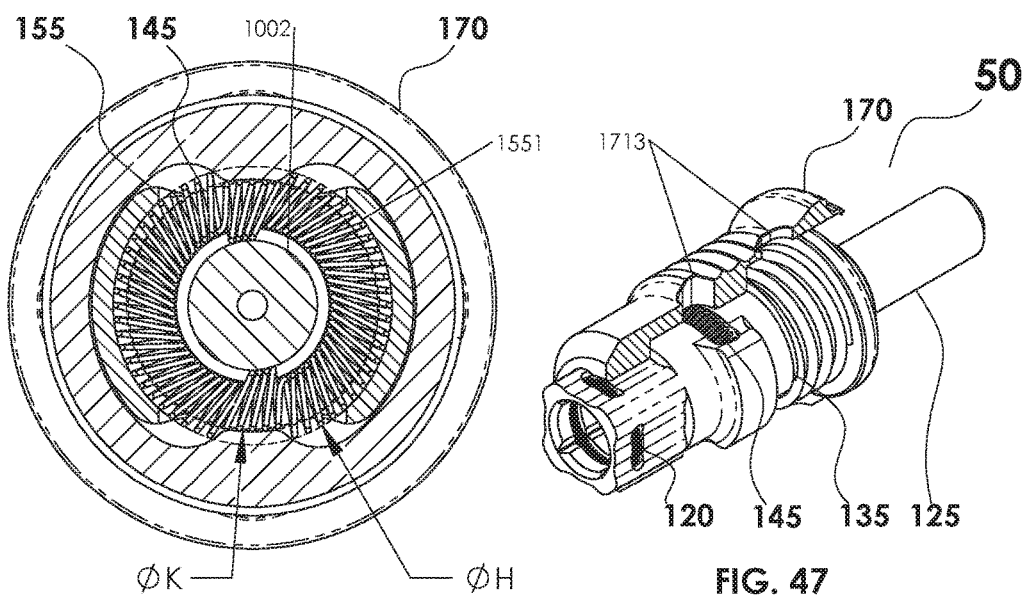
FIG. 46 is an enlarged sectional view of the area 46-46 of FIG. 43.
Figure 47:
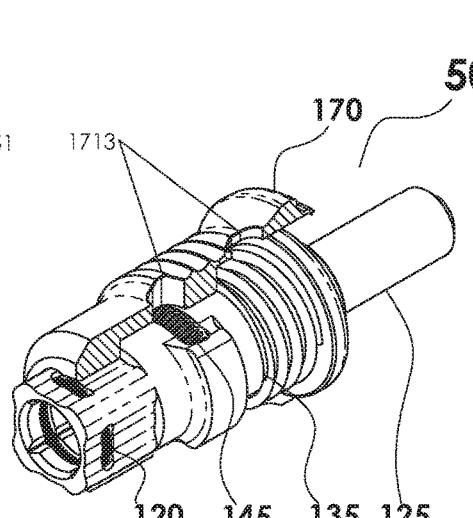
FIG. 47 depicts a partially-sectioned or "cut-away" perspective view of the tool holder 50.
Figure 48:
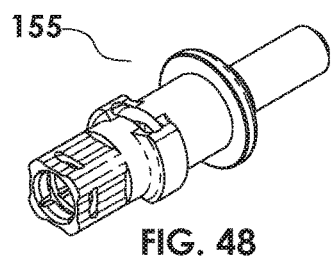
FIG. 48 depicts a perspective view of the body 155.
Figure 49:
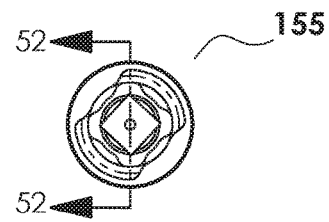
FIG. 49 depicts a rotated left planar view of a body section 155 of the tool holder 50, showing section lines 52-52.
Figure 50:
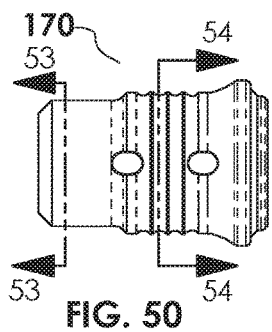
FIG. 50 depicts a front planar view of a collar section 170, showing section lines 53-53 and 54-54.
Figure 51:
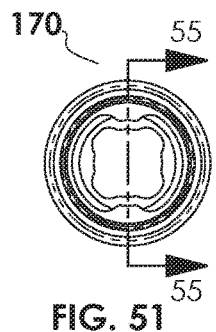
FIG. 51 depicts a right planar view of the collar section 170, showing section lines 55-55.
Figure 52:
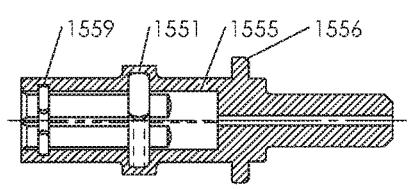
FIG. 52 is a sectional view of the area 52-52 of FIG. 49.
Figure 53:
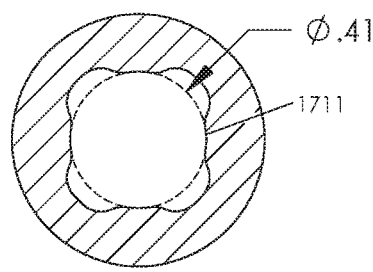
FIG. 53 is a sectional view of the area 53-53 of FIG. 50.
Figure 54:
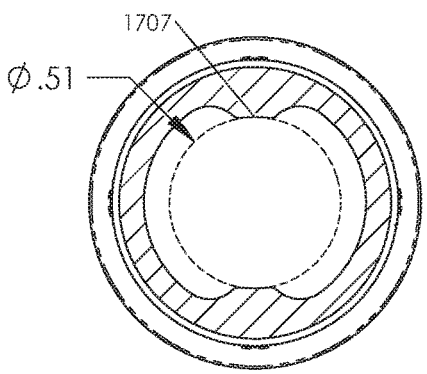
FIG. 54 is a sectional view of the area 54-54 of FIG. 50.
Figure 55:
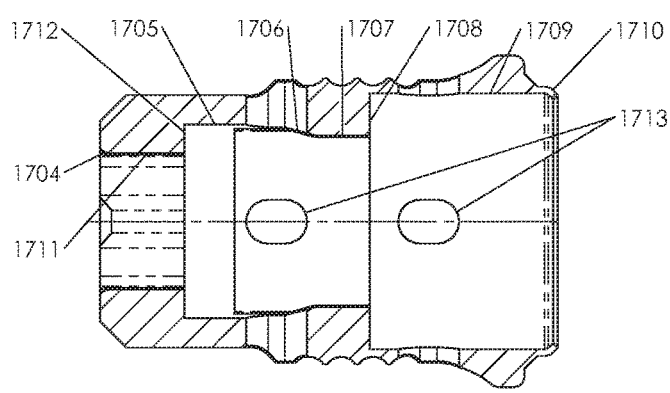
FIG. 55 is a sectional view of the area 55-55 of FIG. 49.

FIGS. 40 and 41 depict front and right planar views of one embodiment of an additional canted coil spring 145, which could be used on the alternative embodiment of a tool holder 50 (see FIGS. 45 and 46). In this embodiment, diameters H and J can represent the diameters of the spring in a static or resting position of the spring.

Referring to FIGS. 42 through 55, there is shown an additional embodiment of to tool holder 50 constructed in accordance with various teachings of the present invention, wherein the retention balls, and respective holes for the balls, of prior embodiments have been replaced with a canted coil spring 145 and groove 1551 arrangement in the body 155. In this embodiment, the canted coil spring 145 desirably works in a similar manner to spring previously described, except that the canted coil spring 145 desirably retains the tool in a desired position within the tool holder as well as stabilizes the tool 100. Desirably, this arrangement facilitates retention of the tool in a desired position and/or orientation when advanced into the curved diametric surface 1002 of the tool 100. When the collar 170 is advanced by the compression spring 135, the section of the canted coil spring 125 is desirably advanced toward axis L, when the conical surface 1706 of the collar 170 contacts the canted coil spring 125. The collar 170 can then continue to advance in the axial direction L until the swaged conical surface 1710 of the collar 170 contacts the radial fillet surface 1556. At this point, the section of the canted coil spring 125 will desirably be contacting diameter K (SEE FIGS. 45 and 46), which can be defined by radial surfaces 1707 of the collar 170, and also desirably contacting the curved diametric surface 1002 of the tool 100. In this embodiment, the various features controlling the canted coil spring 120 of the body 155 and the collar 170 desirably work in the same or similar manner as those corresponding features in other embodiments of the invention, but the presence of the canted coil springs can obviate the need for supplemental engagement balls or other additional components which may fail at inopportune moments and/or be lost or misplaced during disassembly/repair of the tool holder.

Although the figures in these drawings show two deflections of the spring 125, and two sets of corresponding engagement features on the body 155 and collar 170, those of ordinary skill in the art should understand that these disclosed engagement and locking locations could alternatively be accomplished using only one deflection of the spring 145 and one corresponding set of features on the body 155 and collar 170. In a similar manner, those of ordinary skill in the art should appreciate that such actions could also be accomplished with more than two deflections of the spring 125 and/or more than two sets of features on the body 155 and collar 170.

In addition, the disclosed embodiment of a tool holder 50 also depicts cleaning or flushing ports 1713, which are radially placed around the collar 170, in order to easily flush the tool holder 50 from foreign matter and/or to lubricate the tool (if desired). Those of ordinary skill in the art should appreciate that similar features could be added to various components in the other embodiments described herein, including tool holders 10, 20, 30 and 40.

Alternative Configurations

The various components described herein may be formed in a variety of shapes, sizes and/or configurations. For example, the embodiments may be formed in a variety of shapes and configurations, which will desirably facilitate the use of various shaped tools. Similarly, the various features described herein could include features that are unique to specific attachments without departing from the spirit or essential character of the invention.

INCORPORATION BY REFERENCE

The entire disclosure of each of the publications, patent documents, and other references referred to herein is incorporated herein by reference in its entirety for all purposes to the same extent as if each individual source were individually denoted as being incorporated by reference.

EQUIVALENTS

The invention may be embodied in other specific forms without departing from the spirit or essential characteristics thereof. The foregoing embodiments are therefore to be considered in all respects illustrative rather than limiting on the invention described herein. The scope of the invention is thus intended to include all changes that come within the meaning and range of equivalency of the descriptions provided herein.

Many of the aspects and advantages of the present invention may be more clearly understood and appreciated by reference to the accompanying drawings. The accompanying drawings are incorporated herein and form a part of the specification, illustrating embodiments of the present invention and together with the description, disclose the principles of the invention.

Although the foregoing inventions have been described in some detail by way of illustration and example for purposes of clarity of understanding, it will be readily apparent to those of ordinary skill in the art in light of the teachings of this invention that certain changes and modifications may be made thereto without departing from the spirit or scope of the disclosure herein.

What is claimed is:

1. A tool holder assembly for connecting a rotary tool to a rotary tool driver, the rotary tool including a shaft having a shaft end and a shaft diameter, the tool holder comprising:
   a body including a first end configured to connect to a rotary tool driver and a second end configured to receive the rotary tool, the body including a generally cylindrical bore and at least one opening extending through a lateral wall of the body;
   a locking sleeve extending around at least a portion of the body, the locking sleeve slidable along a longitudinal axis of the body from a first position to a second position;
   a first canted coil spring disposed within the generally cylindrical bore at a location proximate to the second end of the body, a portion of the first canted coil spring extending through the at least one opening;
   wherein the portion of the first canted coil spring is not deformed by the locking sleeve when the locking sleeve is in the first position and the portion of the first canted coil spring is deformed by the locking sleeve when the locking sleeve is in the second position, and
   wherein the deformed portion of the first canted coil spring directly engages with and rotationally locks the shaft of the rotary tool within the generally cylindrical bore when the locking sleeve is in the second position.

2. The tool holder assembly of claim 1, wherein an inner diameter of at least a first portion of the first canted coil spring is smaller than the shaft diameter of the rotary tool.

3. The tool holder assembly of claim 1, wherein an inner diameter of at least a portion of the first canted coil spring is smaller than the shaft diameter of the rotary tool when the locking sleeve is in the second position.

4. The tool holder assembly of claim 1, further comprising a second canted coil spring disposed within the generally cylindrical bore at a location distal from the second end of the body.

5. The tool holder assembly of claim 4, wherein an inner diameter of at least a portion of the second canted coil spring is smaller than the shaft diameter of the rotary tool when the locking sleeve is in the second position.

6. The tool holder assembly of claim 1, wherein at least a portion of the generally cylindrical bore has a non-circular cross-section.

7. A tool holder assembly for connecting a rotary tool to a rotary tool driver, the rotary tool including a shaft having a shaft end and a shaft diameter, the tool holder comprising:
   a body including a first end configured to connect to a rotary tool driver and a second end configured to receive the rotary tool, the body including a generally cylindrical bore and at least one opening extending through a lateral wall of the body;
   a locking sleeve extending around at least a portion of the body, the locking sleeve slidable along a longitudinal axis of the body from a first position to a second position;
   a first canted coil spring disposed within the generally cylindrical bore at a location proximate to the second end of the body, a portion of the first canted coil spring extending through the at least one opening; and
   a longitudinally extending spring positioned between the body and the locking sleeve, the longitudinally extending spring biasing the locking sleeve towards the second position;
   wherein the portion of the first canted coil spring is not deformed by the locking sleeve when the locking sleeve is in the first position and the portion of the first canted coil spring is deformed by the locking sleeve when the locking sleeve is in the second position.

8. The tool holder assembly of claim 7, wherein an inner diameter of at least a first portion of the first canted coil spring is smaller than the shaft diameter of the rotary tool.

9. The tool holder assembly of claim 7, wherein an inner diameter of at least a portion of the first canted coil spring is smaller than the shaft diameter of the rotary tool when the locking sleeve is in the second position.

10. The tool holder assembly of claim 7, further comprising a second canted coil spring disposed within the generally cylindrical bore at a location distal from the second end of the body.

11. The tool holder assembly of claim 7, wherein at least a portion of the generally cylindrical bore has a non-circular cross-section.

12. A collet for connecting a rotary tool to a rotary tool driver, the rotary tool including a shaft having a shaft end and a shaft diameter, the collet comprising:
   a body including a first end configured to connect to a rotary tool driver and a second end configured to receive the rotary tool, the body including a central bore and first and second lateral openings extending completely through a peripheral wall of the body, the first and second lateral openings longitudinally spaced apart from each other;
   a sleeve extending around at least a portion of the body, the sleeve slidable on the body from a first position to a second position;
   a first canted coil spring disposed within the central bore at a location proximate to the second end of the body, a portion of the first canted coil spring extending through the at least one opening; and
   a second canted coil spring disposed within the central bore at a location distal from the second end of the body, a portion of the second canted coil spring extending through the second lateral opening;
   wherein the portion of the first canted coil spring contacts an inner surface of the sleeve when the locking sleeve is in the second position.

13. The collet of claim 12, wherein the portion of the first canted coil spring is compressed by the sleeve when the locking sleeve is in the second position.

14. The collet of claim 12, wherein the portion of the second canted coil spring is compressed by the sleeve when the sleeve is in the second position.

15. The collet of claim 14, wherein the shaft of the rotary tool further includes a reduced diameter portion proximate to the shaft end, and the portion of the second canted coil spring is compressed at least partially into the reduced diameter portion when the sleeve is in the second position.

16. The collet of claim 12, wherein the portion of the first canted coil spring and the portion of the second canted coil spring are each deformed by an inner surface of the sleeve when the sleeve is in the second position.

17. The collet of claim 16, wherein the deformed portion of the first canted coil spring directly engages with and locks a portion of the shaft of the rotary tool within the central bore when the sleeve is in the second position.

18. The collet of claim 12, wherein the portion of the first canted coil spring is elastically deformed by contact with the sleeve when the locking sleeve is in the second position.

19. The tool holder assembly of claim 12, wherein a transverse cross-section of at least a portion of the central bore is non-circular.

20. The tool holder assembly of claim 12, further comprising an inner surface portion within the central bore which engages with and rotationally drives a corresponding outer surface of the shaft proximate to the shaft end of the rotary tool.

* * * * *